United States Patent [19]

Purvis et al.

[11] Patent Number: 5,262,640
[45] Date of Patent: Nov. 16, 1993

[54] WINDOW MOUNTED OPTICAL MOISTURE SENSOR HAVING LIGHT PIPES WITH DISTAL ENDS

[75] Inventors: Michael B. Purvis, Toledo, Ohio; Rein S. Teder, Minneapolis, Minn.

[73] Assignee: Libbey-Owens-Ford Co., Toledo, Ohio

[21] Appl. No.: 889,527

[22] Filed: May 27, 1992

[51] Int. Cl.[5] .................................................. H01J 5/16
[52] U.S. Cl. .................................. 250/227.25; 318/483
[58] Field of Search ................ 250/227.25, 577, 572, 250/222.1, 222.2; 356/445, 448, 239, 446; 340/458; 318/483, 444, 443, DIG. 2

[56] References Cited

U.S. PATENT DOCUMENTS

| 4,701,613 | 10/1987 | Watanabe et al. | 250/577 |
| 4,859,867 | 8/1989 | Larson et al. | 318/DIG. 2 |
| 4,935,621 | 6/1990 | Pikulski | 250/577 |

*Primary Examiner*—David C. Nelms
*Assistant Examiner*—Que T. Le
*Attorney, Agent, or Firm*—Marshall & Melhorn

[57] ABSTRACT

Mounting of a sensing unit upon the interior surface of a vehicle windshield for detecting the presence of moisture upon the exterior surface and controlling operation of windshield wipers in response thereto is disclosed. The sensing unit comprises a block in which angularly oriented bores are disposed. Light pipes in a first set of the bores communicate with light sources for transmitting light to the outer surface of the windshield, and light pipes in a second set of the bores transmit light reflected from the outer surface to photo-detectors. The lower ends of the light pipes are coplaner with or raised slightly above the surface of the block which is to be secured to the windshield. The block is affixed to the interior surface of the windshield by a double faced adhesive interlayer which both securely adheres the block to the windshield surface and optically couples the light pipes to the windshield.

13 Claims, 1 Drawing Sheet

WINDOW MOUNTED OPTICAL MOISTURE SENSOR HAVING LIGHT PIPES WITH DISTAL ENDS

BACKGROUND OF THE INVENTION

1. Field of the Invention

This invention relates generally to an optical sensor for controlling operation of the windshield wipers of an automobile in response to the presence or absence of moisture upon the external surface of the windshield of the vehicle, and more particularly to the mounting of the optical sensor upon the interior surface of the windshield.

2. Description of the Prior Art

Motor vehicles have long been equipped with motor-driven windshield wipers for clearing moisture from the external surface of the windshield, at least within the driver's field of vision, and generally over a larger area so as to enhance vision through the windshield. Early model vehicles included a manually operated on-off switch by which the vehicle driver controlled operation of the wipers. Later model vehicles were provided with a two-position switch which allowed operation of the wipers at either a slow or a fast speed to accommodate different rates of rainfall or moisture deposition on the windshield. Still later, multiposition or variable speed switches were provided which allowed the driver to select a wide, if not an infinitely variable, range of speeds to suit conditions. More recently, wiper controls have included a delay feature whereby the wipers operate intermittently at selected time delay intervals.

There has now been developed an improvement over the aforementioned manually operated windshield wiper motor control wherein the motor is automatically activated when moisture is deposited upon the surface of the windshield or other vehicle window upon which a wiper may be employed, such as the rear window. Control devices for providing such automatic activation are disclosed, for example, in U.S. Pat. Nos. 4,476,419 to Fukatsu et al; 4,355,271 to Noack; 4,131,834 to Blaszkowski; 4,463,294 to Gibson; and 4,495,452 to Boegh-Peterson. U.S. Pat. No. 4,620,141 to McCumber et al discloses an automatic control circuit for triggering a sweep of the wiper blades in response to the presence of water droplets on the exterior surface of a windshield, wherein a block-like sensor housing is mounted upon the interior surface of the windshield. The construction of the sensor and its associated circuitry are fully described in the patent, and the disclosure is incorporated herein by reference.

A number of the sensing or detecting units for automatic wiper activation operate upon the principle of a light beam being diffused or deflected from its normal path by the presence of moisture on the exterior surface of the windshield. In one such device a box-like housing may be mounted upon the interior surface of the windshield. The housing is provided with a first set of bores therethrough which are disposed at a predetermined angle to the plane of the associated area of the windshield. Light pipes or rods and light-emitting diodes are fitted within the bores. A corresponding second set of bores is disposed at an angle to the first set such that their longitudinal axes would intersect at points on the exterior surface of the windshield when the housing is affixed to the interior surface. Light conducting rods and photosensitive devices are contained within the second set of bores. Light from the light-emitting diodes is reflected back from the air-glass interface, that is, the outside surface of the windshield to the photo-detectors. The presence of moisture on the surface of the windshield affects the reflection of light at the air-glass interface, and this change in reflected light is electronically processed and utilized as the signal for activating the windshield wipers.

In order for the system to operate properly the sensor housing must remain in a fixed position relative to the windshield surface, and the light pipes or rods must be optically coupled to the windshield so as to prevent spurious reflection of light from the interior surface of the windshield as would be caused, for example, by moisture condensation or dust accumulation on the surface. In other words, the sensor housing should securely engage the windshield and be optically coupled to the windshield so as to effectively eliminate the interface between the light pipes or rods and glass surface from an optical standpoint. Various devices have been proposed for mechanically and otherwise urging the sensor housing into face-to-face engagement with the windshield surface. Such devices are often difficult to mount and aesthetically unattractive, and they tend to inordinately obstruct the driver's view. Thus, none has proven entirely satisfactory in mounting the sensor housing upon the windshield.

SUMMARY OF THE INVENTION

In accordance with the invention, the sensor housing is affixed directly to the surface of the windshield or other vehicle window by means of an intermediate interlayer disposed between the sensor housing and the interior surface of the windshield. The intermediate interlayer preferably comprises a double-faced adhesive body which adheres to both the interior surface of the window and the opposed surface of the sensor housing. The light pipes or rods of the sensor unit are optically coupled to the interlayer and the interlayer, in turn, is of such transparency as to adequately optically couple the light pipes or rods directly to the windshield or other window unit. The sensor is conventionally electrically coupled to the circuitry for controlling operation of the wipers.

DESCRIPTION OF THE DRAWINGS

In the accompanying drawings, wherein like numerals refer to like parts throughout.

DESCRIPTION OF THE PREFERRED EMBODIMENT

Figure 1:
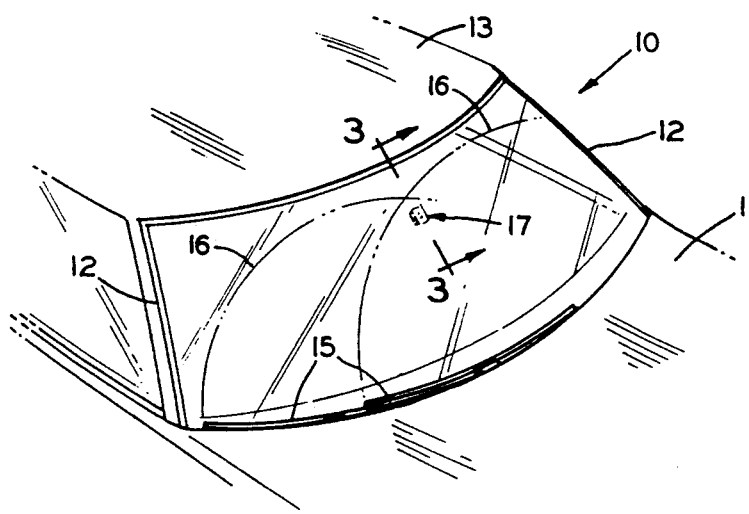
FIG. 1 is a fragmentary perspective view showing an optical sensor mounted upon the windshield of an automobile in accordance with the invention.

With reference first to FIG. 1, there is shown generally at 10 a portion of an automobile molding a hood 11, side posts 12 and a roof 13 defining an opening within which a windshield 14 is mounted. Windshield wiper blades 15, shown in their at-rest position along the lower edges of the windshield, are operable in a conventional manner to swing in arcs 16 and sweep accumulated moisture from the surface of the windshield. There is mounted on the interior surface of the windshield within the area swept by the wipers a sensing unit, identified generally at 17, for sensing the presence of moisture on the opposite or external surface of the windshield and initiating operation of the windshield wipers.

Figure 2:
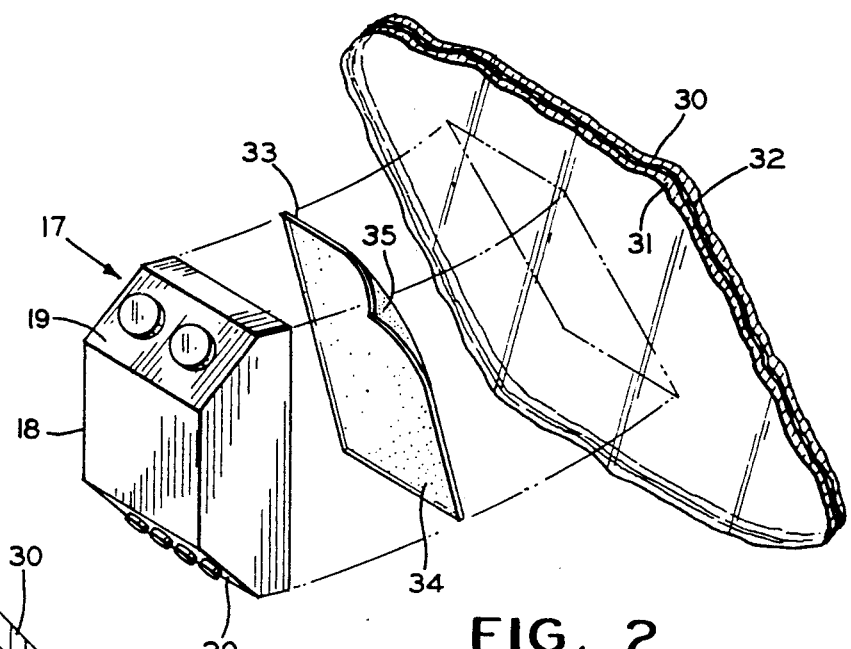
FIG. 2 is an enlarged, exploded perspective view illustrating arrangement of the part of the invention.
Figure 3:
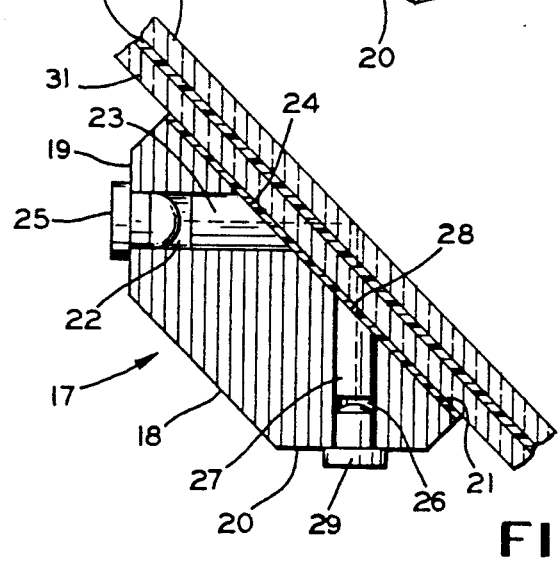
FIG. 3 is a transverse section taken substantially along line 3—3 of FIG. 1.

As best seen in FIGS. 2 and 3, the rain sensor unit 17 may comprise a block 18 of an opaque material which is compatible with and will adhere to the adhesive interlayer to be employed as will be hereinafter described. The block may, for example, be of metal or a suitable rigid plastic material. The block is formed with opposite chamfered surfaces 19 and 20 disposed at a suitable angle, for example approximately 45°, to a base surface 21 which is to face the windshield. The windshield is generally relatively flat in the area where the block is to be mounted, so that the base surface 21 may be planer. However, it is contemplated that the surface 21 may be correspondingly contoured to match a curved windshield surface where appropriate.

A pair of spaced bores 22 extend through the block 18 from the surface 19 at an angle preferably on the order of 45° to the base surface 21. Light pipes 23 as of Lucite ® are positioned within the bores, with their lower or distal ends 24 configured and positioned so as to be coplanar with the base surface 21 of the block 18. Light emitting diodes 25 are fitted into the bores 22. A second set of spaced bores 26 (four illustrated) similarly extends from the chamfered surface 20 through the block at an appropriate angle generally about 45° to the base surface 21. Clear plastic rods or light pipes 27 as of acrylic, disposed within the bores 26, have lower or distal ends 28 configured and positioned so as to be coplanar with the base surface 21. Photo-transistors 29 are fitted into the bores 26 in communication with the light pipes 27.

The bores 22 and 26 are formed so that their imaginary longitudinal axes, and thus the axes of the light pipes 23 and 27 therein, will intersect approximately at the opposite or external surface of the windshield, as shown in broken lines in FIG. 3, when the sensing unit 17 is mounted in operative position upon the interior surface. The light emitting diodes 25 and the phototransistors 29 are electrically connected to the control system circuitry in a conventional manner, the details of which do not form a part of the present invention.

The moisture sensing unit 17 will normally be mounted upon a vehicle windshield in accordance with the invention, and thus for descriptive purposes it is illustrated and described herein as being affixed to a conventional laminated glass windshield 14. Such windshields comprise outboard and inboard sheets of glass 30 and 31, respectively, laminated to a plastic interlayer 32. Lamination of the sheets to the interlayer effectively eliminates their opposed interior surfaces from an optical standpoint. However, it will be readily appreciated that the sensing unit may as well be affixed to a monolithic glass sheet such as conventionally employed for automotive rear windows and side windows. In any event, to operate properly the sensing unit must be optically coupled to the interior surface of the windshield 14 or other window unit. There may not be an air gap or discontinuity between the ends of the light pipes 23 and 27 and the opposed surface of the inboard sheet 31. Such a gap would interfere with transmission of light through the light pipes to and from the windshield. To that end, the block 18 has heretofore been mounted upon the windshield with the ends 24 and 28 of the light pipes in direct contact with the surface of the glass sheet, or with a clear spacer or shim disposed between and in contact with the glass surface and the ends of the light pipes so as to optically couple the light pipes to the glass sheet 31. The block was generally mechanically maintained in contact with the surface of the glass or affixed by a thin film of liquid adhesive which would not interfere with the optically coupled arrangement.

In accordance with the invention, there is provided an intermediate interlayer 33 for both adhesively affixing the block 18 to the surface of the sheet 31 and optically coupling the light pipes 23 and 27 to the glass sheet. The interlayer has opposite major adhesive surfaces 34 and 35 capable of firmly adhering to the base surface 21 of the block and ends of the light pipes 23 and 27, and to the surface of the glass sheet 31, respectively. The interlayer need not be sufficiently transparent to be deemed of optical quality, but is capable of transmitting sufficient incident light from the diodes 22 to the windshield 14 and reflected light from the outer surface of the outboard sheet 30 to the photo-transistors 29 to operate the control system circuitry. A polymeric material capable of transmitting sufficient light in the infrared range to operate the control system and being provided with self-adhering surfaces may advantageously be employed. Examples of suitable materials would be acrylics, polyurethanes and silicones. The interlayer should be of sufficient thickness and plasticity to accommodate slight curvature of the glass surface and fill the space between the glass surface and the base surface 21 without entrapping air bubbles between the block and glass sheet. A product found well-suited for use as the interlayer 33 is commercially available from 3M Company, Minneapolis, Minn., as Product No. 4905. That particular product has a thickness of about twenty mils, and securely adheres to both the sensing unit and the glass surface. Interlayers of greater or lesser thickness may be employed. In order to provide maximum strength the interlayer patch 33 is preferably coextensive with the base surface 21 of the block 18 as illustrated in FIG. 2.

Figure 4:
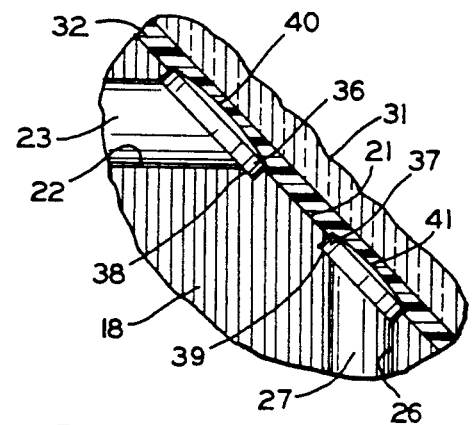
FIG. 4 is an enlarged, fragmentary transverse section similar to FIG. 3, illustrating an alternate embodiment of the invention.

There is illustrated in FIG. 4 an alternate embodiment of the invention wherein the ends of the light pipes 23 and 27 are particularly adapted for preventing formation of air bubbles in the optical coupling regions and accommodating the slight curvature of the windshield surface in the mounting area. To that end, the light pipes 23 and 27 are formed at their ends with annular flanges 36 and 37, respectively, adapted to be seated in corresponding recesses 38 and 39 in the base surface 21 surrounding the bores 22 and 26. The annular flanges project slightly above the planar base surface 21, on the order of 0.005 to 0.010 inch (0.12–0.25 mm), and the ends of the light pipes 23 and 27 are formed with convexly curved surfaces or crowns 40 and 41, respectively. The height of the crowns may be on the order of 0.005 inch (0.12 mm). The seating of the flanges 36 and 37 in the recesses 38 and 39 prevents the light pipes from retracting as pressure is applied in mounting the block 18. Thus, in the areas where optical coupling is required between the light pipes and the glass surface, the light pipes are both slightly raised and convexly curved. These two factors create a region of higher pressure in the interlayer 33 at the optical coupling region as will be apparent in FIG. 4, which discourages the formation of air bubbles in that region. If bubbles and gaps are to form, they are far more likely to form away from the raised regions where the pressure on the interlayer is less than at the raised regions. As indicated heretofore, the raised optical coupling regions also enable the sensor unit to better accommodate the curvature of the various windshields to which it may be affixed.

In assembling either embodiment of the sensing unit on the windshield, the interlayer patch 33 may simply be placed upon the surface 21, and the block 18 then positioned on and pressed against the windshield to complete the assembly. Alternatively, the patch may be positioned on the surface of the glass and the block then pressed into position against the interlayer patch. In either case a layer of primer material, for example a urethane primer, may conventionally be applied to the glass surface to enhance adhesion of the interlayer patch to the glass. The block and interlayer patch may be manually affixed to the windshield, and the assembly procedure is readily adapted to automation. In either event, the interlayer 33 securely affixes the block 18 to the windshield and effectively optically couples the light pipes to the windshield.

It is to be understood that the form of the invention herein shown and described is to be taken as a preferred embodiment only of the same, and that various changes in the size, shape and arrangement of parts, as well as various procedural changes, may be made without departing from the spirit of the invention or the scope of the following claims.

What is claimed is:

1. A sensor mounted upon the interior surface of a vehicle windshield for detecting the presence of moisture on the exterior surface of the windshield comprising, a block having a base surface facing the interior surface of the windshield, a first light pipe in said block for transmitting incident light from an associated light source to the windshield, a second light pipe in said block for receiving and transmitting reflected light from the windshield to an associated photo-detector, said first and second light pipes having distal ends facing said interior surface, and a light transmitting interlayer disposed between the base surface and the windshield interior surface and having adhesive surfaces facing said base surface and said windshield interior surface, the interlayer adhesively securing the block to the windshield and engaging said distal ends for optically coupling said first and second light pipes to said interior surface.

2. A sensor mounted upon the interior surface of a vehicle windshield as claimed in claim 1, wherein said light pipes include distal ends which are coplanar with the base surface of the block.

3. A sensor mounted upon the interior surface of a vehicle windshield as claimed in claim 1, wherein at least one of said first and second light pipes includes a distal end projecting above the base surface of the block.

4. A sensor mounted upon the interior surface of a vehicle windshield as claimed in claim 3, wherein said distal end of said at least one light pipe includes an annular flange projecting above the base surface of the block.

5. A sensor mounted upon the interior surface of a vehicle windshield as claimed in claim 4, including a recess defined in said base surface surrounding said at least one light pipe within which said annular flange is seated.

6. A sensor mounted upon the interior surface of a vehicle windshield as claimed in claim 3, wherein said distal end comprises a convex crown.

7. A sensor mounted upon the interior surface of a vehicle windshield as claimed in claim 1, wherein each said light pipe includes a distal end having an annular flange projecting above the base surface of the block, a recess defined in said base surface surrounding each said light pipe within which the annular flange of the associated light pipe is seated, and wherein each distal end comprises a convex crown facing said interlayer.

8. A sensor mounted upon the interior surface of a vehicle windshield as claimed in claim 1, wherein said interlayer is coextensive with said base surface.

9. A sensor mounted upon the interior surface of a vehicle windshield as claimed in claim 1, wherein said interlayer has a thickness not greater than about twenty mils.

10. A sensor mounted upon the interior surface of a vehicle windshield as claimed in claim 1, wherein said block includes a plurality of said first and second light pipes.

11. A sensor mounted upon the interior surface of a vehicle windshield as claimed in claim 1, wherein said block includes angularly disposed bores extending therethrough to the base surface, the light pipes being disposed in said bores and having distal ends coplanar with the base surface.

12. A sensor mounted upon the interior surface of a vehicle windshield as claimed in claim 11, including a light source in a said bore directing incident light to an associated light pipe in the bore, and a photo-detector in another of said bores receiving reflected light from an associated one of said light pipes.

13. A sensor mounted upon the interior surface of a vehicle windshield as claimed in claim 1, wherein said block includes angularly disposed bores extending therethrough to the base surface, the light pipes being disposed in said bores and having distal ends projecting above the base surface, including a light source in a said bore directing incident light to an associated light pipe in the bore, and a photo-detector in another of said bores receiving reflected light from an associated one of said light pipes.

* * * * *